(12) United States Patent
Zador (10) Patent No.: US 7,609,318 B2
(45) Date of Patent: Oct. 27, 2009

(54) IMAGING SYSTEM UTILIZING SPATIAL IMAGE OSCILLATION

(75) Inventor: Andrew Zador, Ontario (CA)

(73) Assignee: FOVIX Corporation, Richmond Hill, Ontario (CA)

( * ) Notice: Subject to any disclaimer, the term of this patent is extended or adjusted under 35 U.S.C. 154(b) by 1032 days.

(21) Appl. No.: 10/730,189

(22) Filed: Dec. 5, 2003

(65) Prior Publication Data

US 2004/0135898 A1 Jul. 15, 2004

Related U.S. Application Data

(63) Continuation-in-part of application No. PCT/CA02/00886, filed on Jun. 6, 2002.

(30) Foreign Application Priority Data

Jun. 6, 2001 (CA) .................................. 2349828

(51) Int. Cl.
G03B 13/00 (2006.01)
H04N 5/232 (2006.01)
(52) U.S. Cl. ..................... 348/351; 348/352; 348/353
(58) Field of Classification Search .......... 348/351–356
See application file for complete search history.

(56) References Cited

U.S. PATENT DOCUMENTS

| | | | | |
|---|---|---|---|---|
| 5,555,324 A | * | 9/1996 | Waxman et al. | 382/254 |
| 5,771,312 A | * | 6/1998 | Spitzer | 382/167 |
| 5,991,456 A | * | 11/1999 | Rahman et al. | 382/254 |
| 6,912,307 B2 | * | 6/2005 | Spitzer et al. | 382/167 |
| 6,931,152 B2 | * | 8/2005 | Spitzer | 382/167 |
| 7,067,784 B1 | * | 6/2006 | Lowans | 250/201.5 |
| 7,173,662 B1 | * | 2/2007 | Barbastathis et al. | 348/342 |
| 2002/0193845 A1 | * | 12/2002 | Greenberg et al. | 607/54 |
| 2005/0104974 A1 | * | 5/2005 | Watanabe et al. | 348/222.1 |

OTHER PUBLICATIONS

Gillette, J.C. et al.; "Aliasing Reduction in Staring Infrared Imagers Utilizing Subpixel Techniques", Optical Engineering, Soc. of Photo-Optical Instrumentation Engineers, Bellingham, U.S. vol. 34, No. 11, Nov. 1, 1995, pp. 3130-3137.*
Ellias et al., "Pattern Formation, Contrast Control, and Oscillations in the Short Term Memory of Shunting On-Center Off-Surround Networks", Biol. Cybernetics 20. 69-98 (1975).*
Gillette, J.C. et al.; "Aliasing Reduction in Staring Infrared Imagers Utilizing Subpixel Techniques", Optical Engineering, Soc. of Photo-Optical Instrumentation Engineers, Bellingham, U.S., vol. 34, No. 11, Nov. 1, 1995, pp. 3130-3137.

(Continued)

Primary Examiner—David L Ometz
Assistant Examiner—Richard M Bemben
(74) Attorney, Agent, or Firm—Greenberg Traurig LLP (57) ABSTRACT

An imaging system includes an image detector for producing a continuous image signal from an image received thereat; oscillation means coupled to the image detector for inducing a spatial oscillation in the image relative to the image detector; and a spatio-temporally matching filter in communication with the image detector and the oscillation means. The matching filter is configured to filter out aspects of the image signal not associated with the induced oscillation, to thereby provide enhanced image processing of the image.

15 Claims, 7 Drawing Sheets

OTHER PUBLICATIONS

Jensen J.A. et al.; "A New Method for Estimation of Velocity Vectors", IEEE Transactions on Ultrasonics, Ferroelectrics and Frequency Control, May 1998, IEEE, USA, vol. 45, No. 3, pp. 837-851.

Crespo, J.C.; "The Extended Chirp Scaling Processor for the Experimental SAR Systemt of DLR, E-SAR"; Proceedings of EUSAR '96, European Conference on Synthetic Aperture Radar, Konigswinter, Germany, Mar. 26-28, 1996, pp. 353-356.

Ogmen, H. et al.; "Neural Network Architectures for Motion Perception and Elementary Motion Detection in the Fly Visual System", Neural Networks, Elsevier Science Publishers, Barking, GB, vol. 3, No. 5, 1990, pp. 487-505.

Moreira, A. et al: "Airborne Sar Processing of Highly Squinted Data Using a Chirp Scaling Approach With Integrated Motion Compensation", IEEE Transactions on Geoscience and Remote Sensing, IEEE Inc., New York, U.S., vol. 32, No. 5, Sep. 1, 1994, pp. 1029-1040.

Murakami, I. et al.: "Assimilation-type and contrast-type bias of motion induced by the surround in a random-dot display: evidence for center-surround antagonism", Vision Research, Nov. 1996, Elsevier, UK, vol. 36, No. 22, pp. 3629-3639.

Veldkamp, W.B.: "Microoptics and microelectronics for image processing", Solid-State Circuits Conference, 1993, Digest of Technical Papers, 40th ISSCC., 1993 IEEE International, San Francisco, CA, US Feb. 24-26, 1993, New York, NY, USA, IEEE, US, Feb. 24, 1993, pp. 130-131, 275.

International Search Report and International Examination Report, PCT/CA02/00886.

* cited by examiner

IMAGING SYSTEM UTILIZING SPATIAL IMAGE OSCILLATION

RELATED APPLICATIONS

This patent application is a continuation-in-part of International Patent Application PCT/CA02/00886, entitled "Vision System, Method and Apparatus Utilizing Spatial Oscillation", filed Jun. 6, 2002, and claims the benefit of the filing date of Canadian Patent Application 2,349,828, entitled "Method, Apparatus, and System for Extracting Denoised, High-Resolution Images, Texture, and Velocity from a Lower-Resolution, Noisy Detector", filed Jun. 6, 2001. International patent application PCT/CA02/00886 was published, in the English language, in publication document WO 02/099745 A2, on Dec. 12, 2002.

FIELD OF THE INVENTION

The present invention relates generally to imaging systems and methods, and more particularly to an electronic vision system that obtains high-resolution de-noised images and velocities from a lower-resolution detector.

BACKGROUND OF THE INVENTION

The extraction of real-time velocity and noise-free detail from time-blurred frames of video has been inherently inaccurate. The problem is that current image detection technology is based upon raster, frame-at-a-time, or arrays of independent pixels for scene capture using light (x-ray, ultraviolet, infrared or other medium) integrating pixels. This process is limited in resolution by the number of pixels and their dimensions, and cannot avoid integrating noise into the detection process. Accordingly, attempts have been made to devise an improved image detection and processing mechanism.

For instance, J. C. Gillete ("Aliasing Reduction in Staring Infrared Imagers Utilizing SubPixel Techniques") describes a method of uncontrolled micro-scanning for reducing aliased signal energy in a sequence of temporal image frames obtained by periodically sampling an image with a finite array of image detectors. Gillete takes a series of discrete low resolution samples of an image at a specified undersampling frequency, while spatially oscillating the detector between samples, thereby providing a sequence of static image frames, each having a subpixel offset relative to one another. By comparing the gray-scale values of successive image frames, for each image frame an estimate is calculated of each subpixel shift that occurs between successive image frames. Each image frame in the image sequence is then mapped onto a high resolution grid, based on the respective estimated interframe displacement. If the estimated shift is the same for multiple frames, then the pixel values at the overlapping positions are averaged to suppress noise.

Since Gillette only calculates an estimate of the subpixel shifts, Gillette is unable to determine the portion of the magnitude of the pixel values actually attributable to the subpixel shifts. This problem is compounded by the fact that Gillette averages the values of the pixels in successive frames that have the same estimated subpixel shift, thereby precluding removal of those aspects of the image frames not attributable to the subpixel shift. As such, the high resolution grid would include pixels whose values are not attributable to the subpixel shifts (eg. resulted from detector noise).

Further, Gillette must estimate the subpixel shift in each frame, resulting in multiple frame delays for one high-resolution image. Also, the frame basis of the method, and the corresponding finite exposure times, results in motion blur in each frame as objects traverse the scene. Additionally, given the discrete sampling nature of the method, aliasing in time is possible if the sampling frequency is insufficient for the scene motion.

H. Ogmen ("Neural Network Architectures for Motion Perception and Elementary Motion Detection in the Fly Visual System") describes a neural network model of motion detection in the fly visual system. Ogmen uses center-surround opponency as the basis for both directional and non-directional motion detection, both in the center field-of-view and the periphery. However, Ogmen only performs statistical neural filtering post-processing of the vision data, thereby integrating noise with the vision data, with the ultimate result of reduced signal detection.

For the foregoing reasons, there is a need for an improved electronic imaging system.

SUMMARY OF THE INVENTION

The present invention is directed to an imaging system and method utilizing spatial image oscillation to obtain enhanced image processing of an image.

In one aspect of the present invention, the imaging system includes:
- an image detector for producing a continuous image signal from an image received thereat;
- oscillation means coupled to the image detector for inducing a spatial oscillation in the image relative to the image detector; and
- a spatio-temporally matching filter in communication with the image detector and the oscillation means for providing enhanced image processing of the image, the matching filter being configured to filter out aspects of the image signal not associated with the induced oscillation.

In another aspect of the present invention, the imaging system includes:
- an image detector for producing a continuous image signal from an image received thereat;
- oscillation means coupled to the image detector for inducing a spatial oscillation in the image relative to the image detector; and
- a spatio-temporally matching filter in communication with the image detector and the oscillation means, the matching filter being configured to filter for aspects of the image signal (eg. image edges) that are associated with the induced oscillation for providing enhanced image processing of the image.

In one implementation, the system includes a secondary array of opponent center/surround detectors grouped by spatial orientation to provide multiple evenly-spaced orientations in the primary array for receiving signal inputs at the center/surround detector's center (interpreted as either positive or negative depending upon the polarity of opponent surround being passed the illumination information), and receiving opposing input from primary detectors adjacent to a primary central detector, each center/surround detector fed by one or more detectors from the primary detector array, therein extracting improved contrast, velocity, and relative luminance change information.

In an aspect of the present invention, the method involves the steps of:
(i) providing a continuous image signal by spatially oscillating an image relative to an image detector, and (ii) with reference to the spatial oscillation, filtering out aspects of the image signal not associated with the spatial oscillation.

In another aspect of the present invention, the method involves the steps of spatially oscillating an image in one or more dimensions relative to a detector array, and filtering for aspects of the signal (eg. image edges) that are associated with the induced oscillation.

In one implementation, the spatial oscillation step is provided by a swept-frequency sinusoid chirp. Further, the method includes the step of receiving signal inputs at the center/surround detector's center (interpreted as either positive or negative depending upon the polarity of opponent surround being passed the illumination information), and receiving opposing input from primary detectors adjacent to a primary central detector, each center/surround detector fed by one or more detectors from the primary detector array, therein extracting improved contrast information to provide real-time spatial motion and velocity information.

The invention obtains a high-resolution, de-noised image and component velocities, directly from a lower-resolution detector feeding contrast/motion-sensitive opponent center surround detectors, by removing spatio-temporal noise, and correcting for pixel-to-pixel differences due to differences in detector responses, both in DC offset and gamma variations. As well, the invention greatly reduces downstream computational load for intelligent vision applications, and since this is applied at the detector level, if no active transmission, or illumination are involved, it can be purely passive, and therefore stealthy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PRESENTLY PREFERRED EMBODIMENT

Figure 1:
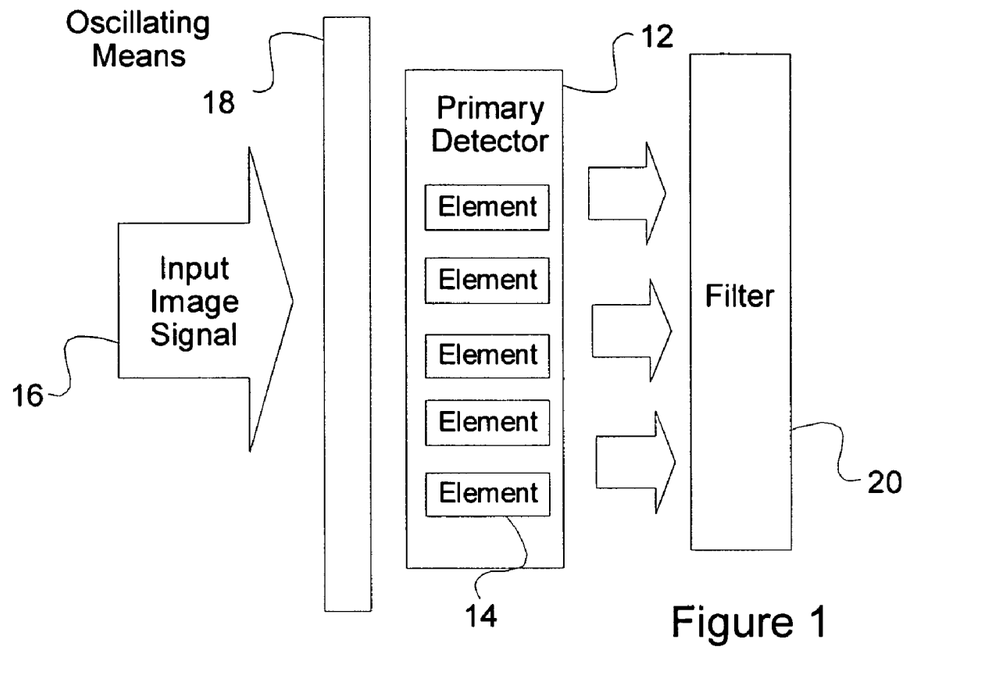
FIG. 1 is an overview of a vision system utilizing spatial oscillation in accordance with the present invention.

The present invention is directed to a vision system, method and apparatus utilizing spatial oscillation. As illustrated in FIG. 1, the system includes a primary detector array 12 having detector elements 14 sensitive to an input image signal 16, means 18 for inducing a spatial oscillation in the image 16 relative to the primary detector array 12, and a filter 20 for filtering the image signal according to the spatio-temporal motion signature of the induced oscillation so as to extract those elements whose motions reflect the induced oscillation, therein removing noise events to provide enhanced image quality and simplified post-processing.

In an embodiment of the present invention, the induced oscillation means 18 is provided by a swept-frequency sinusoid chirp. In an embodiment of the present invention, the system further includes a secondary array 24 of opponent center/surround detectors 26 grouped by spatial orientation to provide multiple evenly-spaced orientations in the primary array 12 for receiving either positive or negative signal inputs at the center/surround detector's center, and receiving opposing input from primary detectors adjacent to a primary central detector, each center/surround detector fed by one or more detectors from the primary detector array, therein extracting improved de-noised, calibrated, contrast information and improved real-time spatial and velocity information.

Figure 2:
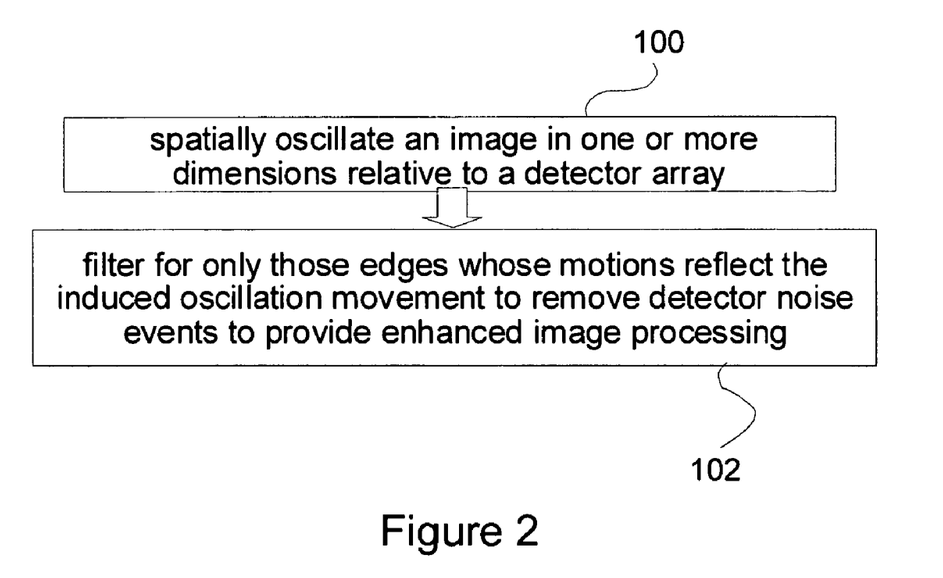
FIG. 2 is an overview of a vision method utilizing spatial oscillation in accordance with the present invention.

As illustrated in FIG. 2, the method includes the steps of spatially oscillating an image in one or more dimensions relative to a detector array 100, and filtering for only those edges whose motions reflect the induced oscillation movement, to remove detector noise events to provide enhanced image quality and simplified downstream processing 102.

In an embodiment of the present invention, the spatial oscillation step is provided by a swept-frequency sinusoid chirp. In an embodiment of the present invention, the method further includes the step of receiving either positive or negative interpreted signal inputs at the center/surround detector's center, and receiving opposing input from primary detectors adjacent to a primary central detector, each center/surround detector fed by one or more detectors from the primary detector array, therein extracting improved de-noised, calibrated, contrast information and real-time, increased accuracy spatial and velocity information 106.

Spatially coincident opponent center/surround structures fed by the primary detector array are employed to remove spatio-temporally random detector-noise events. Spatially oscillating the image with respect to the detector, filtering only for those edges whose motions reflect purely the induced oscillation, and obtaining accurate phase information at edge-crossings accurately locates static edges. Spatio-temporal activity not suitably matching the space-time characteristics of the oscillation, or a Doppler shifted version of it, can be treated as noise. The texture isolation (discussed below), edge-motion detection, and noise removal processes rely on principles deduced from mammalian vision.

In order to visualize how the size of the detector can be made irrelevant in detecting objects smaller than the detector, one can imagine a circular optical detector divided into four detecting quadrants and illuminated with a spot of light falling entirely on the detector area. If the four quadrants are compared in pairs by determining ratios of energies falling on both quadrants, then the position of the centroid of the illuminating spot can be known accurately limited only by the accuracy of the comparator and not by the sizes of the four quadrants, which could be arbitrarily large. Given the self-calibration capability (discussed at page 11, herein) of adjacent pixels of a detector used in this manner, the timing of edge crossings can provide substantially improved spatial and exposure resolution when compared with the resolution that pixel dimension and bit-depth alone can provide. Spacings between detectors can give rise to hysteretic response depending upon the direction of crossing (analogous to backlash in a mechanical system), but neural logic can bisect such hysteresis giving true centroid crossing timings.

To address spatial isolation of textures, edges and points, for a particular orientation of oscillation of an image upon a detector, center/surround crossings by various contrast-amplitudes representing a single slice of texture in that direction will yield a specific frequency spectrum of edge-crossing bursts, dependent upon the spacings and contrast-amplitudes within the texture slice and the frequency, or frequencies in the case of a chirp, of the generated oscillation. It should be noted that since the contrast contours of the texture can be determined by oscillation to a higher spatial accuracy at the detector array than individual primary detector size alone would indicate, substantially more accurate high-frequency information is available for texture discrimination than would be present from a standard static bitmap of that same image.

In an embodiment of the present invention, a chirp in one or more dimensions can be put to particular use as the induced oscillation, since any object in motion across the field of view of the imaging array during the chirp will yield a Doppler shift with higher SNR, giving potentially more accurate velocity information. For example, a camera employing this method will only update "just-noticeable-difference" (JND) or greater moving edges, and do so instantaneously as they move, since motion of edges across opponent center/surround detectors provides an immediate response signal, and static objects can be optionally ignored after an oscillation has stopped, since they normally fade due to the memory time constant of the primary detectors.

Utilizing Doppler techniques, accurate object velocities can be collected during oscillation by detecting the frequency shift with respect to the induced oscillation of objects crossing multiple opponent center/surround detectors, and noting the orientation of the sequence of crossings. For a particular orientation of oscillation, center/surround crossings by a slice of texture in that orientation will yield a specific frequency spectrum of edge-crossing bursts. Given more than one orientation and possibly different scales of such an oscillation, and grouping regions by their resulting oscillation spectra, texture regions can be efficiently isolated and identified. Textures, edges, and isolated points will have substantially different spectra useful for identification.

The detectors can be incorporated with any reasonable "memory" time constant, or be programmed based upon local illumination upon each zone of the image on the array. Such a system will have access to free and accurate real-time velocity data, eliminating the need to calculate inaccurate motion vector fields from sequential, time-blurred and possibly interlaced frames. Velocity information determined from local motion on the array can be predicted and fed-forward in a velocity memory layer co-located with a similarly fed-forward contrast data in the contrast memory, following the object, permitting detector integration times to be de-coupled from faint but real contrasts of possibly fast-moving objects. Currently, motion vector fields are computationally expensive and require a latency of at least one image frame delay plus computation time, rendering them unusable in high-speed real-time motion applications. Information about velocities determined from the differences between frames seen in existing systems can be seriously outdated by the time it is available, even if such information were accurate for the period being calculated. Also intra-frame blur makes instantaneous location uncertain, and noise is irreversibly integrated with signal, which also adversely affects velocity determination. Post-processing can use intelligent methods to clean an image, but once noise and signal have mixed this is still a form of guessing.

In an embodiment of the present invention, using more than one direction of oscillation, regions with similar texture slice spectra in more than one direction can be grouped together; yet another plausible purpose of micro-saccades.

The terms "primary" and "secondary" are hereinafter used to differentiate between the light-detecting first layer of "on"-detectors, and the second layer of opponent process detectors fed by the first layer.

The invention's primary detector array will typically be monochrome for most applications, but can easily be extended to color or to non-light applications such as ultrasound. Each of the linear (symmetric) opponent center/surrounds of the secondary array of detectors are fed by at least three primary luminance detectors, which upon exposure to illumination of the primary detectors feeding it, will output a fast-rise-time pulse followed by a decaying analog level. This analog level will be proportional to either the luminance difference or the log of the luminance difference depending upon the application, between the center of the opponent center/surround detector and its surround.

This level will have a characteristic polarity depending upon whether the opponent detector was on-center or off-center, while the surround will be opponent to either variant of center. Further, the level will have a time-constant, decaying after initial exposure, and will also possess a turn-on threshold that could be interpreted as a Just Noticeable Difference (JND), between the center and its surround. This threshold can be fixed or tuned in real-time to imitate human sensitivity, or any desired application-specific sensitivity. The JND can in fact refer to any achievable or required difference sensitivity for a particular task, detection system, or image medium. Multiple opponent center/surround detectors of the same polarity chained in a specific orientation, and exposed to a moving luminance edge will output a train of pulses directly related to the apparent velocity of the edge, and superimposed on the contrast level signal representative of the exact times of successive center/surround crossings.

During static periods, such as between induced oscillations, objects undergoing real motion detectable in the plane of the array can be selectively given attention by temporarily suppressing those detectors having detected stationary edges during the previous oscillation, greatly reducing the computational load on robotic vision systems.

In an embodiment of the present invention, for the luminance case extendable to color channels and any other form of signal, the array is oscillated under the source such that each pixel in the array gets to see each source point. Given a fixed offset error at each primary detector, and (given the speed of the process) a fixed set of illumination values being sampled by the detectors, the resulting set of sampled values constitute a set of N equations in N unknowns, where the unknowns are the offsets. Given a small spatial sample for each detector such that the local luminance variation is probably small, the offset could even be a luminance-varying gamma curve, since over a small luminance variation the offset would still be a fixed value. Thus, the systematic relative differences between adjacent detectors could be determined, and the pixels calibrated against their neighbors by adjustable weightings to the opponent layer to provide real-time, ambient illumination detector self-calibration.

Figure 3:
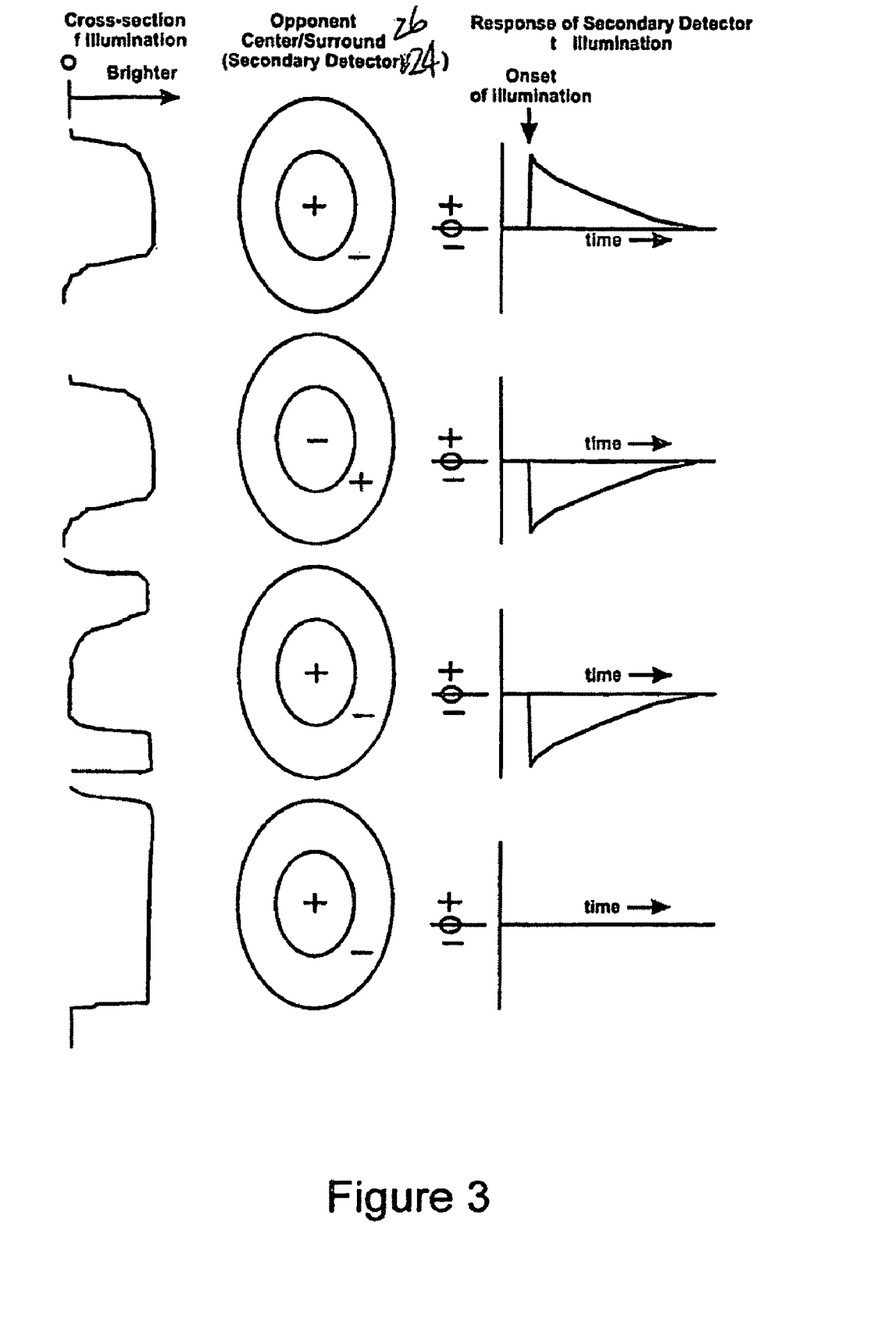
FIG. 3 illustrates various proposed illuminated opponent center/surround structures with output responses.
Figure 4:
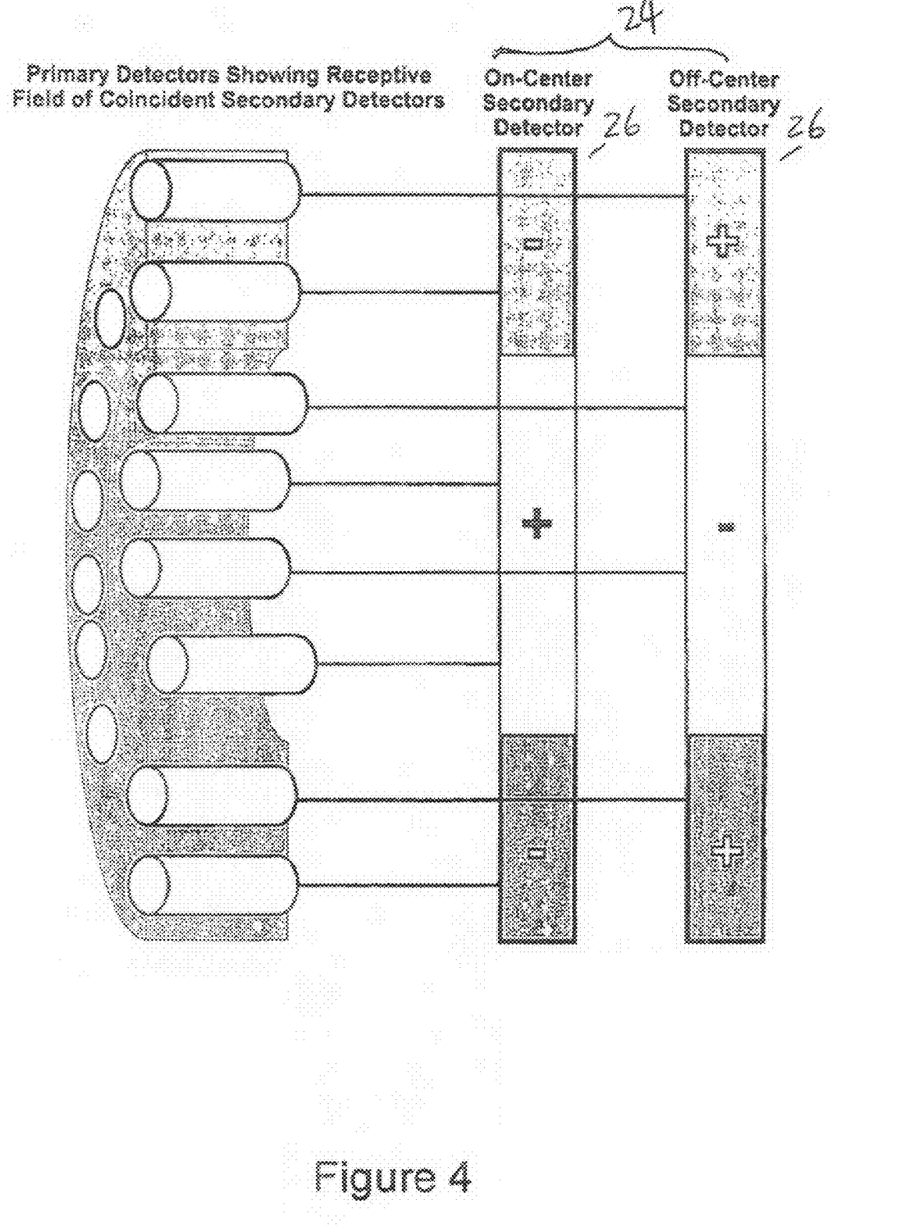
FIG. 4 illustrates several primary detectors connected to a secondary opponent center/surround cell, interleaved with other primary detectors connected to another secondary opponent center/surround cell of opposite polarity.

As illustrated in FIGS. 3 and 4, an image is provided by a two-dimensional image detector array having an image focused upon it. The image is analyzed as a differential image in an opponent center/surround structure having multiple imaging pixels connected by logic circuits similar to structures and processes found in the human retina. Any luminance edge within the image crossing such an opponent center/surround detector will trigger a motion detection event or impulse at the instant that the centroid of an edge passes over the center of such a structure, along with a decaying level representing the instantaneous contrast between the center and its surround.

Figure 5:
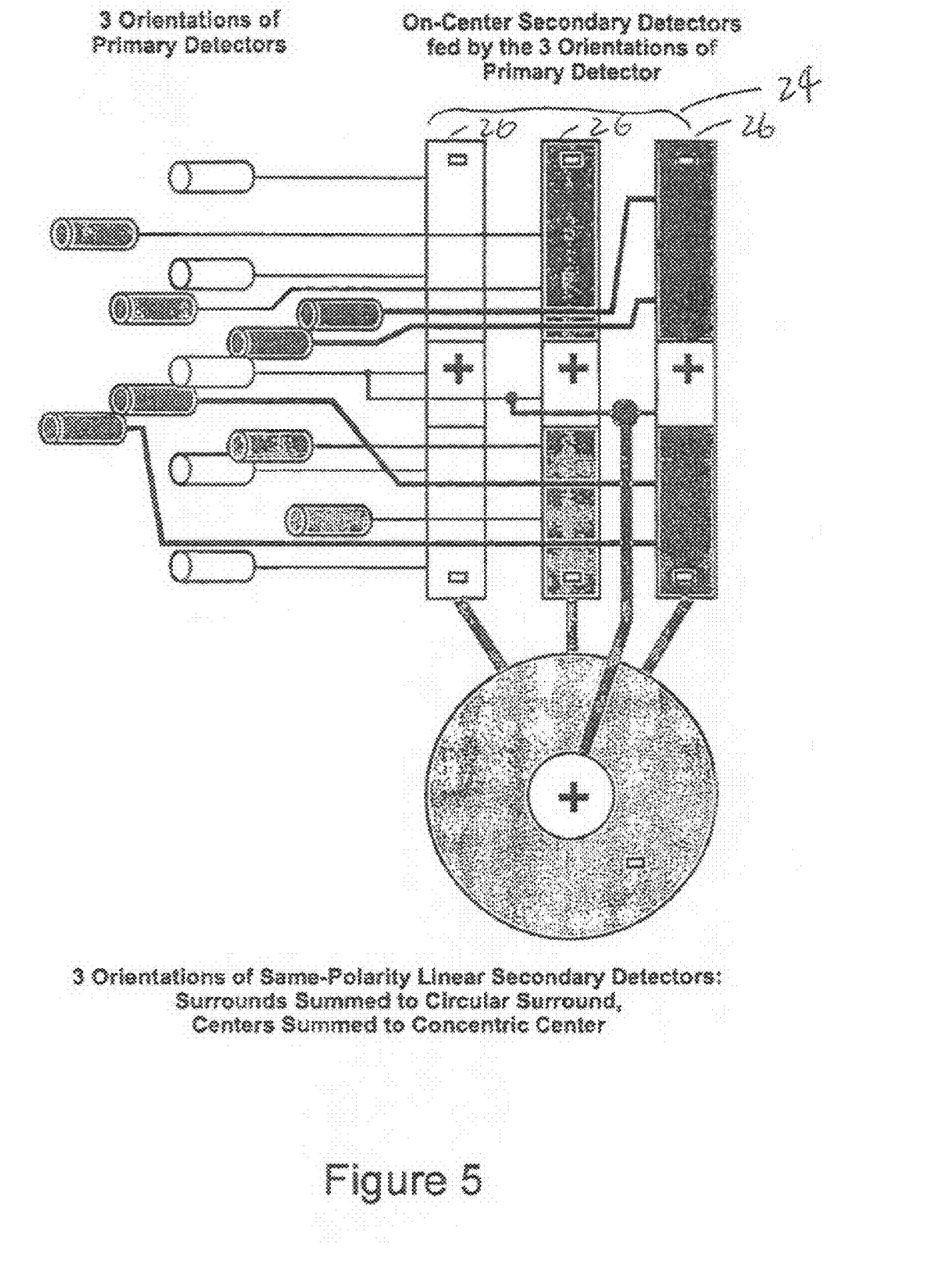
FIG. 5 illustrates several orientations of linear secondary opponent center/surround cells contributing to a resulting circular secondary opponent center/surround cell.

In an embodiment of the present invention as illustrated in FIG. 5, the detector's circularly symmetric center/surrounds are composed of various orientations of rows of pixels connected as linear center/surrounds, contributing separately to the concentric circular opponent structure; similar to the ocular dominance column mechanisms in human vision. This will yield orientations of edges and directions of motions (assuming overlapping center/surrounds yielding quadrature signals for a motion). The attainable timing accuracy of the centroid of a spot crossing over an opponent center/surround detector will primarily determine the achievable "resolution" of the edge, and not the array's pixel size or the center or surround sizes of an opponent center/surround structure.

If every edge that crosses such a detector is subsequently displayed with the exact relative timing of its crossing, then the perceived spatial resolution will be much higher than that viewed on a raster scan display of the same physical resolution. Alternatively, the implied finer path knowledge of the moving edge can be displayed as a temporal sequence of finer pixel crossing events on a higher-resolution display. This additional temporal knowledge at edges will yield higher spatial resolution information than would be indicated purely by the detector's pixel size, enabling the use of larger pixels at the detector to integrate more signal, and thereby yielding a higher signal-to-noise ratio (SNR) at a given exposure.

In an embodiment of the present invention, since the image is viewed as a differential luminance map at the secondary opponent layer of the detector system, if the imaging array border is covered by reference-black then all luminance, and similarly colors, can be coded as spatially accumulated differences from the surrounding black reference across several center/surround detectors, or several scales of center/surround detector. This becomes crucial in the human eye where there is no clear evidence of a low-pass version of the image for calibrating color and luminance, as is available in a wavelet pyramid.

Figure 6:
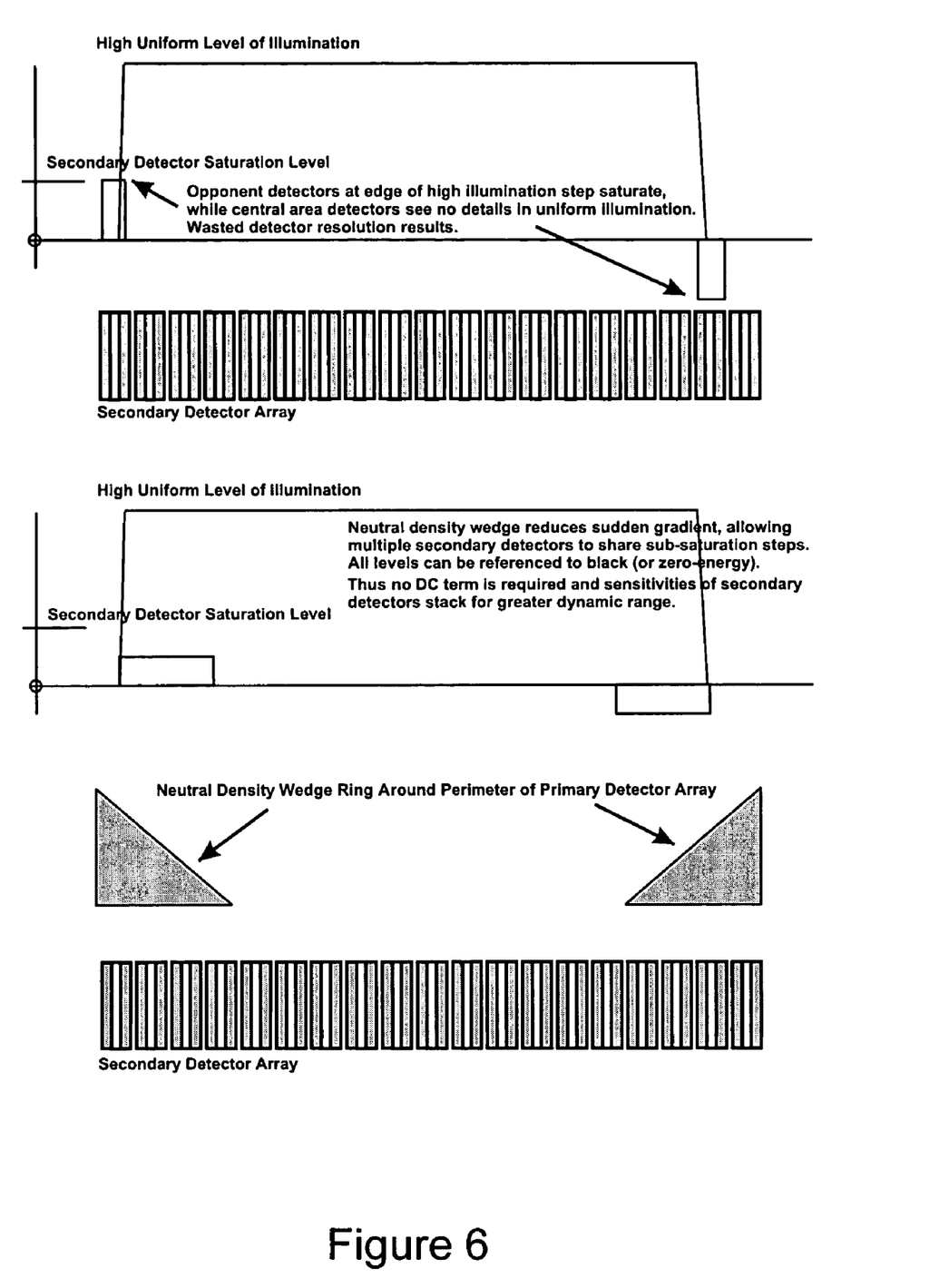
FIG. 6 illustrates a graded neutral density wedge covering the edge of a detector array.

In an embodiment of the present invention as illustrated in FIG. 6, a known neutral density wedge fading to reference-black is used to aid in allowing a gradual brightening near the edge of the field of view of the detector toward the center even in a uniformly bright field, permitting adjacent opponent center/surrounds near the edge to report differences kept within the range of each of the individual center/surrounds. In a multi-resolution structure such as the wavelet pyramid, this permits a higher dynamic range than any individual opponent center/surround cell is capable of providing due to the successive approximation nature of the increasingly finer scales. Equivalently, the local JND threshold at each center/surround can be spatially and temporally varied to prevent saturation or under-illumination (recording the threshold to compensate at the output), or to reflect the characteristics of human vision, or to reduce information content in low light, high contrast, or high texture for uses such as reducing the computational load on any subsequent intelligent vision system.

Ignoring texture, most slowly varying luminances in naturally illuminated scenes can be described by JND contours, which are only one bit deep by definition, similar to isobars on weather maps. Therefore, the dynamic range of each individual pixel does not have to be great in a multi-resolution opponent center/surround structure. This is particularly the case if each pixel's sensitivity is logarithmic. These may be the underlying structures in biological vision where the total dynamic range is huge, while the sensitivity to tiny adjacent differences is simultaneously high; yet individual neural detector "bit-depths" must be too small to accurately cover the entire dynamic range of the visual system.

Figure 7:
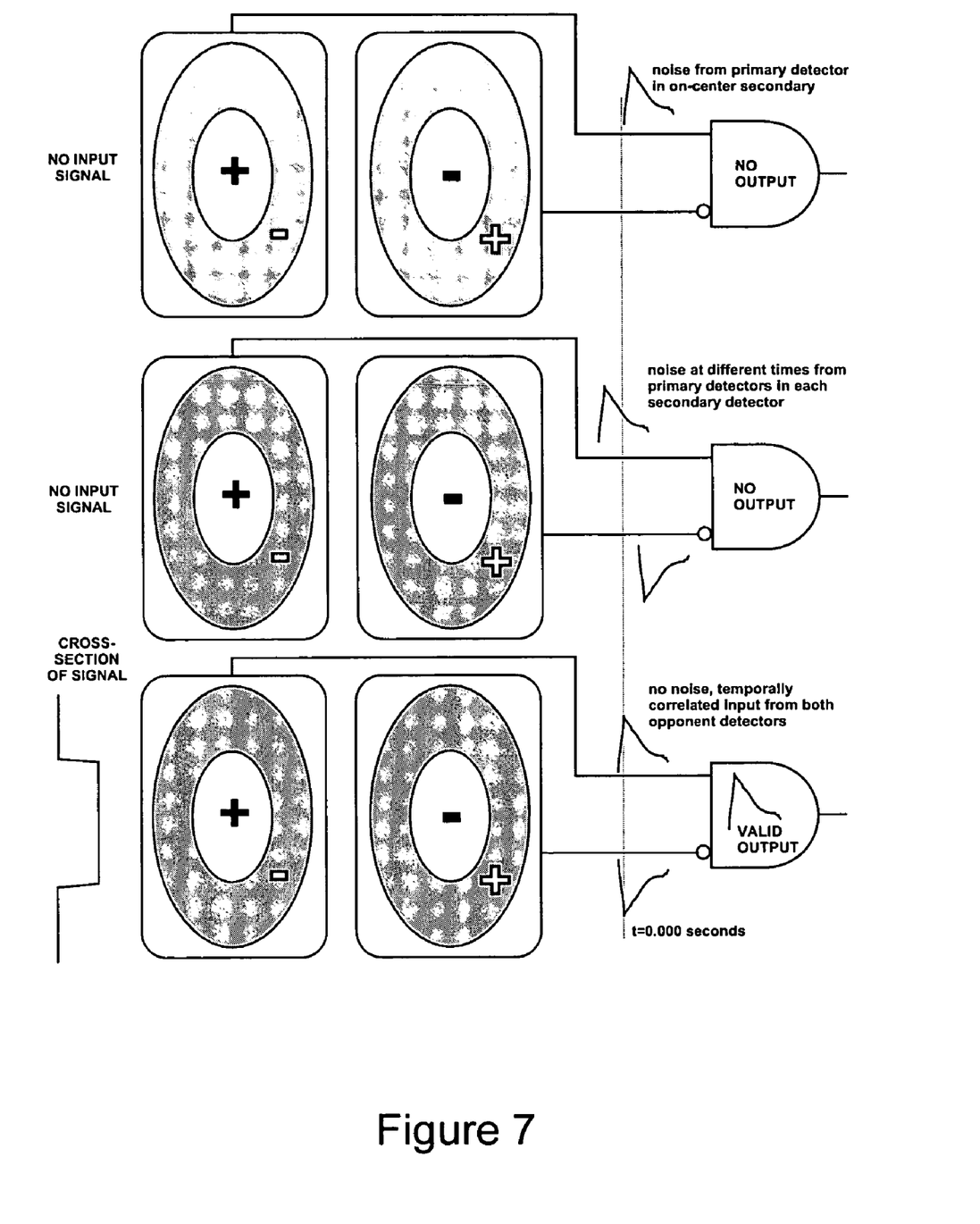
FIG. 7 illustrates 3 examples of spatially coincident opposite-polarity center/surrounds, and their role in cancelling detector noise.

If dual-polarity pairs of opponent center/surrounds are used to cover the same spatial location, again reflecting similar human retinal structures, an edge traversing an on-center/off-surround will cause a positive impulse, while the same event simultaneously detected in an off-center/on-surround will be indicated by a negative impulse. As illustrated in FIG. 7, if on-centers poll a small population of pixels in a small spatial cluster, and off-centers poll a different small population of pixels spatially centered in the same cluster, with surrounds sampled analogously from an annulus of pixels around the central cluster, a single noise event at a given instant in any pixel contributing to a center or its surround will unlikely correlate to any simultaneous single pixel noise event contributing to a center or surround of the opposite polarity at the same location. Such a dual-detection process will cancel out most detector noise events due to the lack of a simultaneous response from the spatially coincident, opposite-sign opponent center/surround. It will also confer immunity to direct current (DC) level changes analogous to common mode rejection in a differential amplifier.

In an embodiment of the present invention, the oscillation path can be precisely determined by employing a reference illumination spot aimed at a sample point within the detector, and subsequently feeding back the exact measured nature of the oscillation. Detector noise and fast time-varying image noise will have an extremely small probability of passing through such a filter. Also, luminance variations, which are seen to be a systematic function of pixel location on the detector (known as "fixed pattern noise", although it may be luminance-dependent) via use of the oscillation, can be nulled thus calibrating all the primary detectors relative to their neighbors. This is suspected of being another purpose for micro-saccadic motions seen in the human eye.

Between oscillations, any real motion of an edge along a specific orientation of several center/surround detectors will cause a series of centroid crossover events that can be directly interpreted from the detector as a velocity in much the same way that a child dragging a stick along a picket fence will indicate speed information by the frequency of the stick rattling along the fence. Since the detector reports every center/surround crossing event, there is no missing motion data and therefore velocity and motion vector fields can be reported precisely.

In an embodiment of the present invention, if the opponent detectors indicating the latest positions of static edges found during the oscillation phase are suppressed between oscillations (by the detector memory time constant) the system can be made very sensitive to anything possessing real motion, since only these detectors will report motion during the periods between oscillations. In any intelligent vision application the isolation of known moving targets and the identification of their velocities are critical time-consuming tasks, which this detector structure can perform efficiently and accurately with little processor burden.

Groups of these detectors in the array can be further chained in a multi-resolution structure with different orientations separately chained.

As stated previously, the oscillation can be used in different orientations of the image to extract multiple directions of one-dimensional, high-resolution texture spectra over different lengths of opponent center/surround detectors at a given coarser scale for rough identification of similar texture areas. A coarse scan can group textures using a crude spectral comparison for purposes of locating approximate borders between different textures. Then, concentrating along these approximate borders, a higher-resolution texture-difference scan can be made using more sensitive criteria. This process avoids massive iterations or computationally prohibitive filtering, while permitting spatially accurate texture edges to be mapped. These texture spectra are derived from "pulse trains" generated by the chained opponent center/surround detectors having the textures oscillated over them, and will reflect their spatial resolution. By using a multi-resolution center/surround structure starting with a coarser scale, regions can be grouped by similarity, then at a finer scale near texture-difference borders previously derived from the coarse scale examination, exact texture borders can be determined using less on-chip processing. Thus, similar texture regions can be efficiently isolated and, given a suitable look-up table or other known methods, textures identified.

Scaling is logical since an arbitrary sample set of primary detectors can be used for a particular center and/or surround, and several different scales can, in principle, use any one detector variously as center or surround and as on-type or off-type. Scale can be employed to gather more light as above, and to verify an event in a region by its appearance at different scales in the same locale. In this case the selection of primary detectors being sampled is important, since it may produce an unwanted self-fulfilling prophecy by measuring an event at multiple scales using the same, possibly noisy pixel as evidence at various scales. Assuming judicious pixel selection for each scale at a given location, evidence of motion at a coarse scale with sufficient illumination can be used to adjust integration times and gains of pixels reporting to a finer scale, in order to facilitate extracting more detailed motion information.

These logical scales can apply to various lengths and orientations of lines acting as opponent surrounds. This can be used to predict direction and velocity of objects crossing the field of view at various speeds. So, if one wants more velocity accuracy, then the firing rate of chained short lines being crossed is better. If sensitivity to a low contrast edge moving is important, then summing perpendicular to direction of motion will be useful. Thus, steered shape opponent-surrounds can be created to extract faint edges, and by spatially steering these shapes one can maximize the sensitivity to the direction and velocity of a specific stimulus.

Figure 8:
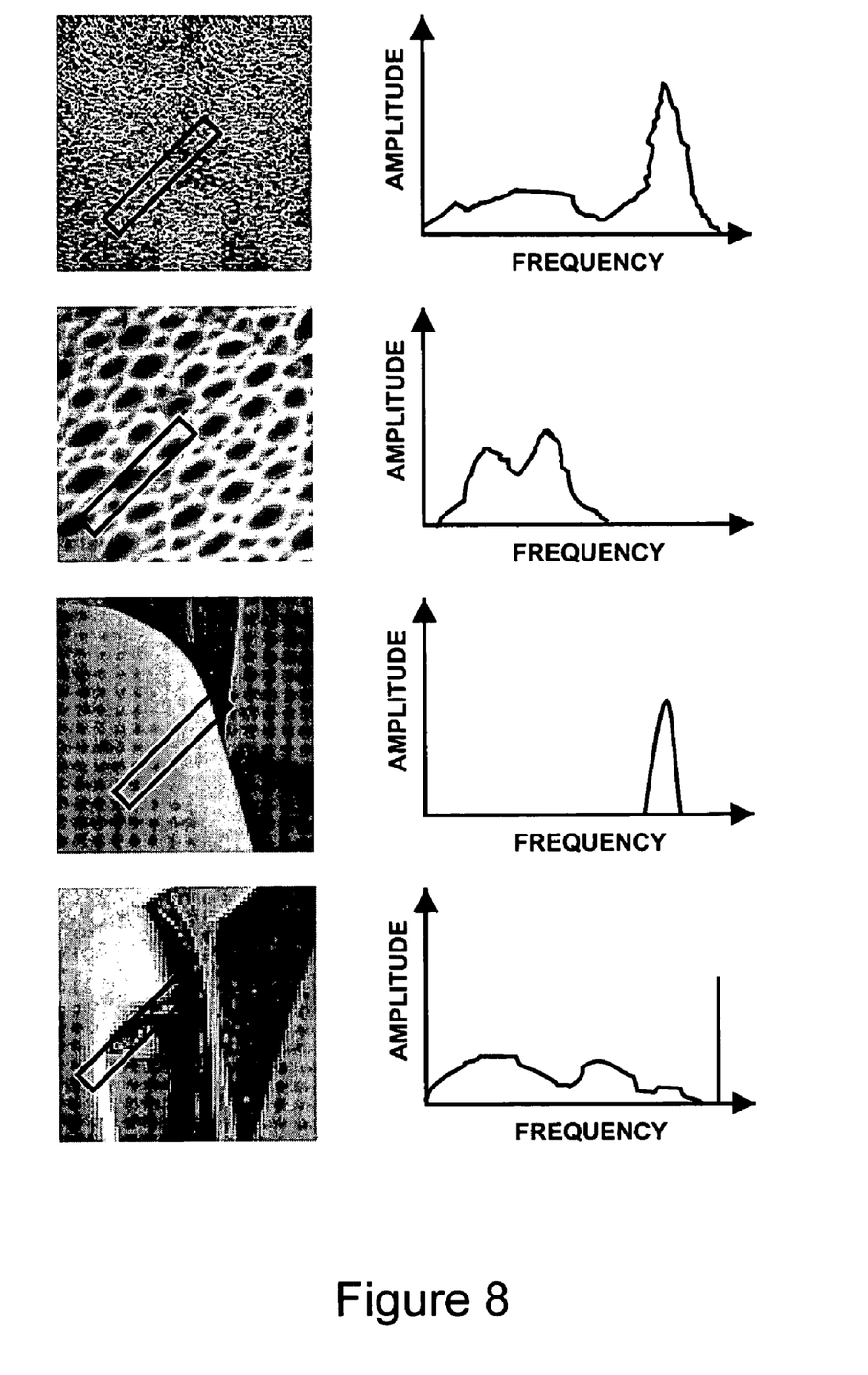
FIG. 8 illustrates a single orientation of oscillation along a path sampling aligned slices of different textures and features, and their resulting one-dimensional center/surround crossing spectra.

In human vision, it is believed that the spatial processing of texture occurs first at the retina, possibly to limit processing performed at the visual cortex, but that there is insufficient neural structure or bandwidth to handle the texture directly in the retinal image-space. Micro-saccades would serve this purpose by transforming the two-dimensional image structure into a few one-dimensional structures, such as neural pulse trains "mixed-down" to the lower frequencies that are handled by neurons. Texture can be differentiated from edges and isolated points given a particular size of center/surround region. As illustrated in FIG. 8, the oscillation of a texture in various directions will yield orientation-dependent noise spectra, while oscillating across a simple edge will provide a much narrower shaped band response dependent upon the orientation of oscillation, with an isolated point giving back a narrow spike for any orientation of oscillation.

In an embodiment of the present invention, a stereoscopic pair of these detector arrays can be utilized to provide information such as safe landing locations for pilots based upon texture and flatness analysis, as well as instantaneous trajectories for path prediction from accurate stereoscopic velocities. A stereoscopic pair can also prove useful for the navigation of systems such as robotic arms, vehicles, or aircraft in three dimensional space for interception/avoidance and capture tasks since the array will report every detector element crossing event in real-time with accurate positions and velocities. This is a capability not available in prior art raster-based vision systems (which cannot report pixel-to-pixel motions, and suffer from motion blur), such systems processing raster-scanned images and extracting inaccurate and delayed motion vector fields, since a delay of one video frame alone in any prior art real-time system makes navigation and interception of moving objects very difficult for anything but constant velocity or low velocity applications.

By intermittently adding a one-dimensional or a two-dimensional pre-determined spatial oscillation to the image or the detector array, real edge crossing events due to static edges in the image crossing these detectors (solely due to the relative oscillation) will possess the spatio-temporal motion signature of the induced oscillation. These events can be filtered for, since the oscillation path is known or can be accurately tracked.

This "threshold extension" technique used to reject detector noise, thereby increasing SNR, can be applied to radiology to permit a reduction in the dose of radiation required to produce an x-ray, and/or to bring diagnosable features up and out of the signal noise.

In an embodiment of the present invention, a spatially varying detection threshold based upon localized image content can be employed to suppress texture, control entropy, or match human vision characteristics. The detector does not employ raster scanning, but instead reports the exact timings and orientations of edge crossings from one opponent center/surround to the next. Therefore, its spatial and velocity-reporting accuracy are functions of its opponent center/surround temporal sensitivity, enabling the use of cheaper and larger pixels with fewer pixels per detector array. Since actual velocities are reported in real-time from the array's support logic, there is no need to calculate processor-intensive inaccurate motion-vector fields. In an embodiment of the present invention, the systematic cancellation of detector-difference during the oscillation of the array provides for the self-calibration of all adjacent detectors.

The invention utilizes the differential image provided by the center/surround structures to accurately determine position from the exact time of the crossing or phase of a contrast edge over such a detector. This can give high positional accuracy, fairly independent of the shape or size of the detectors/pixels themselves, enabling the use of large-area pixels with good light gathering capability with simultaneously high spatial resolution extracted from the time domain. The invention extracts a high-resolution image with a minimum of residual detector noise whether the image is optical, acoustic, composed of radio waves, x-rays, or any other medium, along with texture, motion and velocity information, all directly from a detector array and its supporting logic.

The invention obtains a high-resolution, de-noised image directly from a lower-resolution detector by removing spatio-temporal detector noise and pixel-to-pixel differences due to differences in detector responses, while analyzing sub-pixel resolution motions. As well, the invention greatly reduces downstream computational load for intelligent vision applications by isolating moving objects while removing noise, and since this is applied at the detector level, in the absence of any active transmission or illumination it can be purely passive, and therefore stealthy.

Although the present invention has been described in considerable detail with reference to certain preferred embodiments thereof, other versions are possible. Therefore, the scope of the appended claims should not be limited to the description of the preferred embodiments contained herein.

I claim:

1. A method of image processing comprising the steps of:
spatially oscillating an image in one or more dimensions relative to a primary detector array sensitive to an input image so as to produce an image signal possessing a spatio-temporal motion signature of the induced oscillation;
feeding each of a secondary array of opponent center/surround detectors from one or more detectors from the primary detector array so as to extract improved contrast and motion information;
calibrating each detector in the primary and secondary detector arrays with respect to neighboring one or more detectors in the primary and secondary detectors using the image signal during the oscillation; and
filtering the image signal according to the spatio-temporal motion signature of the induced oscillation to extract those elements whose motions reflect the induced oscillation.

2. The method according to claim 1, wherein the spatial oscillation is provided by a swept-frequency sinusoid chirp.

3. The method according to claim 1, comprising extracting differential image information from the image.

4. The method according to claim 1, wherein the secondary detector comprises a plurality of opponent center/surround detectors, and the filtering step comprises comprising increasing at least one of spatial and motion accuracy of the image detector by extracting phase information of elements of the image crossing secondary array detector boundaries of the opponent center/surround detectors to provide one or more of increased spatial accuracy and velocity accuracy.

5. The method according to claim 1, comprising detecting Doppler shifts of opponent crossing frequencies for extracting real-time velocity information of elements crossing secondary, array detector boundaries during the induced oscillation.

6. The method according to claim 1, comprising timing detector crossings during periods in which no oscillation is induced, for extracting at least one of real-time position and velocity information of elements crossing secondary array detector boundaries during the induced oscillation.

7. The method according to claim 1, comprising performing a first coarse scan, and subsequently a finer scan of edges detected by the first coarse scan to provide improved imaging efficiency.

8. The method according to claim 1, comprising extracting real-time, systematic detector-to-detector sensitivity variation information from the image signal to provide relative calibration of the primary and secondary detector arrays.

9. The method according to claim 8, wherein the extracted information is a measure of the local contrast and/or local velocity to provide for spatially adapting the sensitivity threshold of the primary detector array in real-time.

10. The method according to claim 1, wherein the filtering step comprises suppressing between oscillation periods of the image detector an output of those of the detector elements reporting those of the opponent detectors indicating the latest positions of static edges of the image found during one of the induced oscillation periods, and increasing sensitivity of those of the detector elements reporting real motion of the image between the oscillation periods.

11. The method according to claim 1, further comprising extracting information pertaining to various motion spectra sampled at various orientations and/or scales of different textures exposed to the detector array, derived from the relative motions in each orientation, of the textures upon the detector array.

12. The method according to claim 1, comprising limiting or preventing opponent detector saturation using the reference black surrounding the perimeter of the primary detector array.

13. The method according to claim 12, wherein the reference black is provided by a neutral density wedge surrounding the perimeter of the primary detector array.

14. The method according to claim 1, comprising chaining the detector arrays in groups separately chained in different orientations to provide a multi-resolution structure.

15. The method according to claim 1, comprising measuring the induced oscillation.

* * * * *

UNITED STATES PATENT AND TRADEMARK OFFICE
CERTIFICATE OF CORRECTION

PATENT NO.      : 7,609,318 B2                                      Page 1 of 1
APPLICATION NO. : 10/730189
DATED           : October 27, 2009
INVENTOR(S)     : Andrew Zador It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1604 days.

Signed and Sealed this

Twelfth Day of October, 2010

David J. Kappos
*Director of the United States Patent and Trademark Office*